Nov. 24, 1925.  1,563,165
W. D. CLARK
FIRE CONTROL MECHANISM FOR AIRPLANE GUNS
Filed March 18, 1925   12 Sheets-Sheet 1

Fig. 1.

Inventor
W. D. Clark
By
Attorney

Nov. 24, 1925.　　　　　　　　　　　　　　　1,563,165
W. D. CLARK
FIRE CONTROL MECHANISM FOR AIRPLANE GUNS
Filed March 18, 1925　　12 Sheets-Sheet 2

Nov. 24, 1925.  
W. D. CLARK  
1,563,165  
FIRE CONTROL MECHANISM FOR AIRPLANE GUNS  
Filed March 18, 1925    12 Sheets-Sheet 3

Nov. 24, 1925.　　　　　　　　　　　　　　1,563,165
W. D. CLARK
FIRE CONTROL MECHANISM FOR AIRPLANE GUNS
Filed March 18, 1925　　12 Sheets-Sheet 4

Inventor
W. D. Clark
By
Attorney

Nov. 24, 1925.

W. D. CLARK 1,563,165

FIRE CONTROL MECHANISM FOR AIRPLANE GUNS

Filed March 18, 1925   12 Sheets-Sheet 6

Inventor
W. D. Clark
By
Attorney

Nov. 24, 1925. 1,563,165
W. D. CLARK
FIRE CONTROL MECHANISM FOR AIRPLANE GUNS
Filed March 18, 1925 12 Sheets-Sheet 9

Inventor
W. D. Clark

Nov. 24, 1925.  
W. D. CLARK  
1,563,165  
FIRE CONTROL MECHANISM FOR AIRPLANE GUNS  
Filed March 18, 1925   12 Sheets-Sheet 11

Inventor  
W. D. Clark  
By  
Attorney

Patented Nov. 24, 1925.

1,563,165

UNITED STATES PATENT OFFICE.

WILLIAM DOUGLAS CLARK, OF WASHINGTON, DISTRICT OF COLUMBIA.

FIRE-CONTROL MECHANISM FOR AIRPLANE GUNS.

Application filed March 18, 1925. Serial No. 16,515.

*To all whom it may concern:*

Be it known that I, WILLIAM DOUGLAS CLARK, a citizen of the United States, residing at Washington, District of Columbia, have invented new and useful Improvements in Fire-Control Mechanism for Airplane Guns, of which the following is a specification.

This invention relates to improvements in fire control mechanism for the guns of airplanes or the like.

One of the objects of the present invention is to provide a simple and practical means whereby one or more guns carried by an airplane may be fired individually or collectively and in proper relation to the rotation of the propeller of the plane.

A further object is to provide a mechanism of the above general character having relatively few parts which may be inexpensively manufactured and assembled.

A further object is to provide a mechanism of the last above mentioned character which may be operated by the pilot of the plane without necessitating a removal of his hands from the control mechanism.

Other objects will be in part obvious and in part hereinafter pointed out in connection with the accompanying sheets of drawings illustrating two of various possible embodiments of the invention and in the several views of which corresponding parts are indicated by similar reference characters.

In these drawings.

In order that a clearer perception of the present invention may be had it is stated that one of the purposes of the present device is to provide a means for firing fixed aircraft machine guns electrically instead of mechanically by the use of conveniently located switches preferably concealed within the hand grip of the control stick of the airplane.

This mechanism comprehends the use of a solenoid for releasing the synchronizing gear of the usual well-known character driven by the airplane engine.

In certain types of airplanes, it is desirable that the amount of energy required to operate the firing release of the guns be reduced to a minimum. As the normal maneuvering of airplanes requires the use of both hands and feet, it becomes advisable to provide a means for operating the guns without removing the hands from the control mechanism.

As the control stick described below is a very sensitive element, no considerable force on it is desirable for any object other than governing the movements of the airplane, therefore, an equally sensitive gun firing mechanism is preferable, whereby the effort applied in firing the guns will, in no way, effect the movement of the airplane or tend to pull the plane off the target.

These objects may therefore be accomplished by providing a trigger mechanism of any desired character, directly associated with the hand grips on the control stick, whereby the firing will require merely a movement of the thumb or finger at the instant the gun sights are trained on the target. In the preferred or simplified form, as illustrated in Figures 1 to 13, inclusive, either gun may be operated independently by actuating its respective firing gear or operated simultaneously by actuating the firing release. Accidental firing of the guns will be prevented, as the contact buttons located within the guard formed on top of the grip are protected by safety switches, for rendering the firing mechanism operative or inoperative at the will of the pilot, as will hereinafter be more specifically pointed out.

Figure 1:
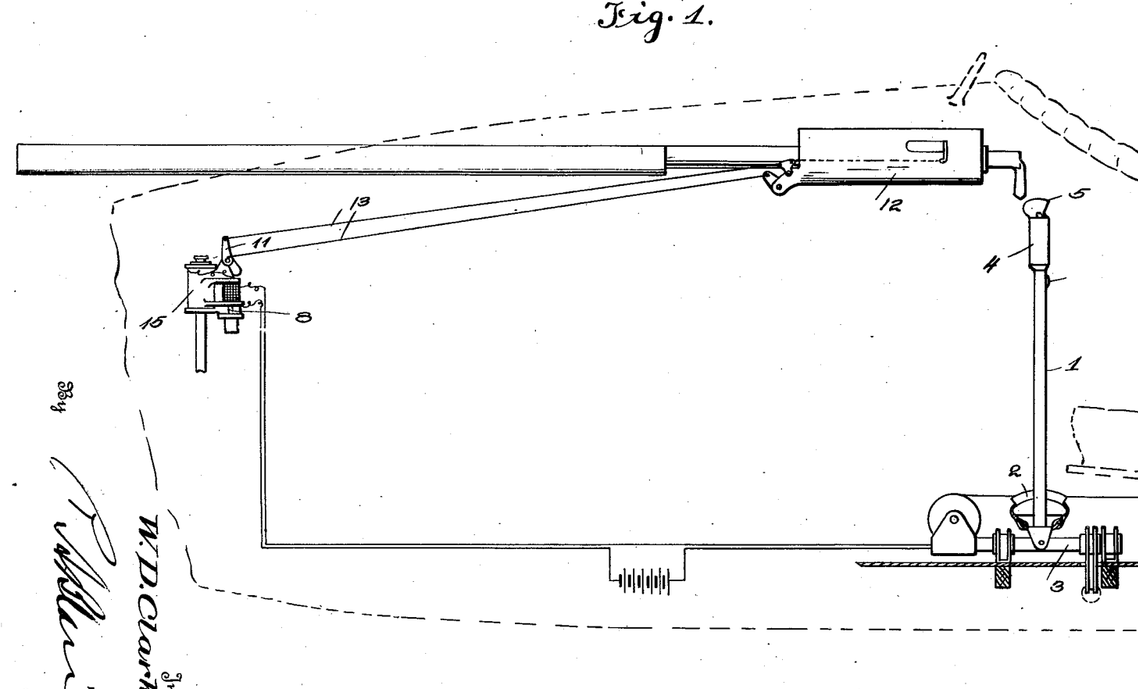
Figure 1 is a diagrammatic outline showing the forward portion of an airplane having the mechanism located therein.
Figure 2:
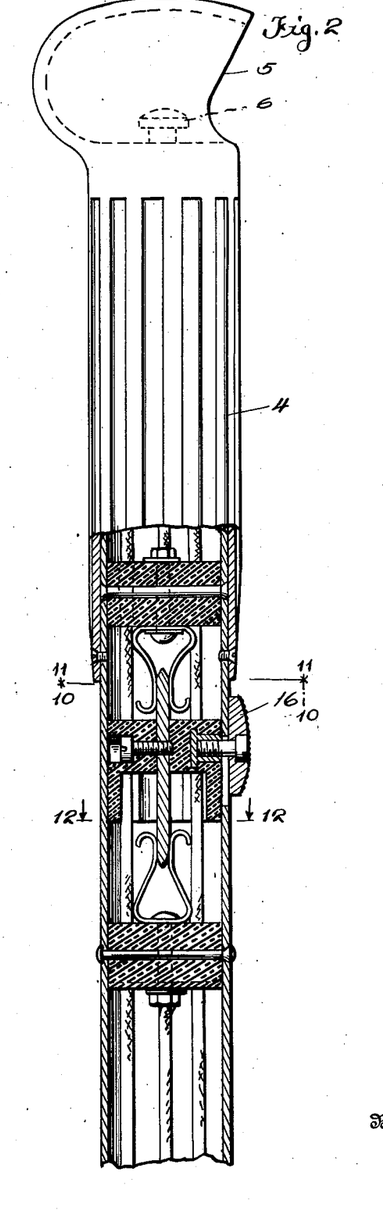
Figures 2 and 2ª are detail side elevations of the control stick partly in section.
Figure 3:
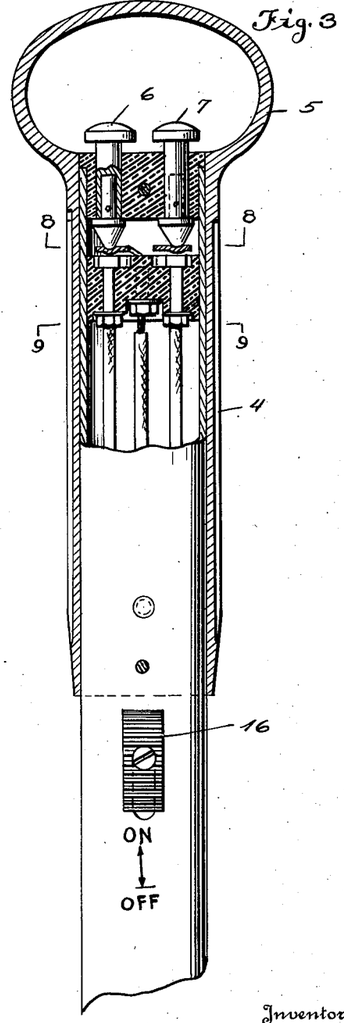
Figures 3 and 3ª are rear views partly in section.
Figure 4:
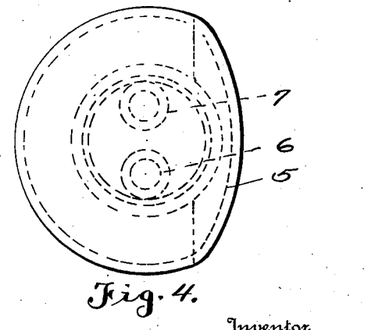
Figures 4 and 5 are detail views of the grip for housing the contact buttons.
Figure 5:
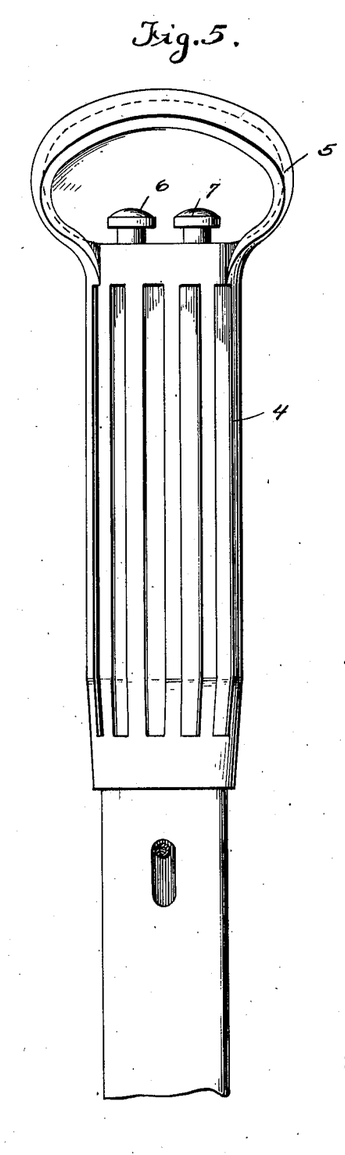
Figures 6, 13:
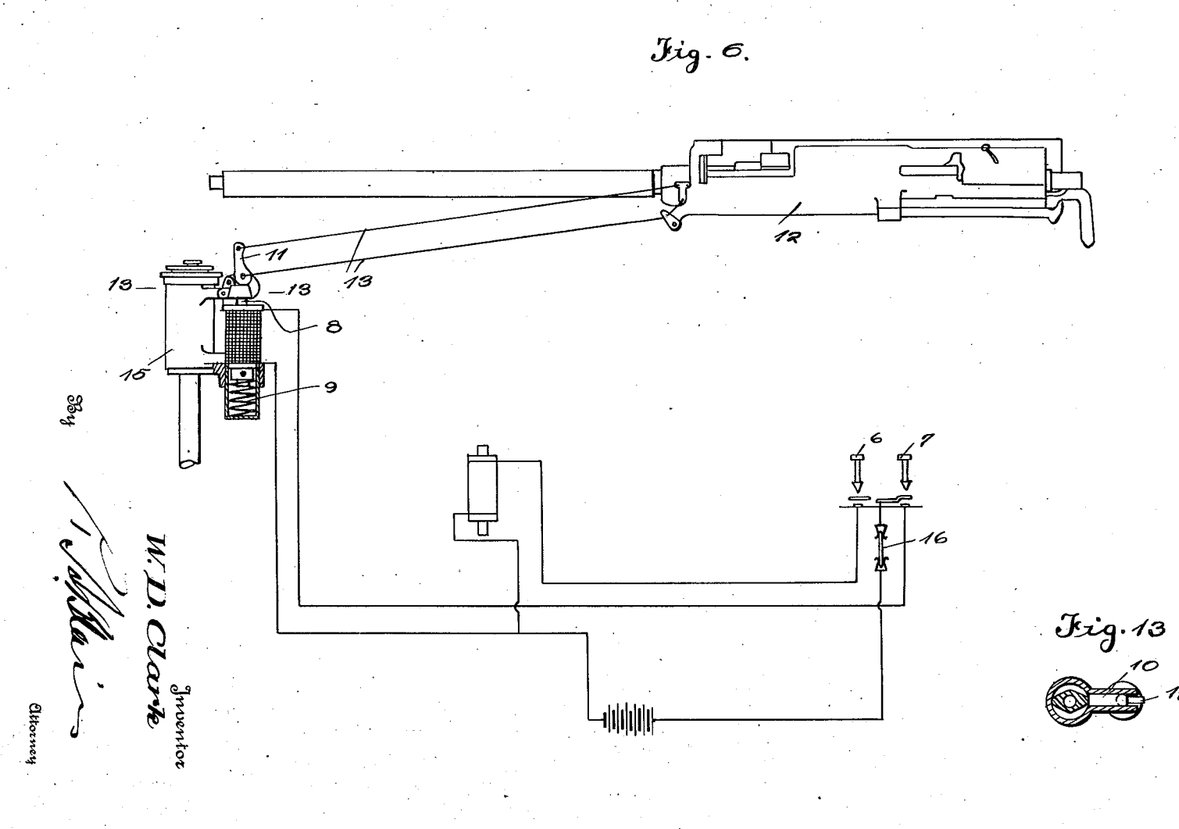
Figure 6 is a wiring diagram.
Figure 13 is a section on the line 13—13 of Figure 6.
Figure 7:
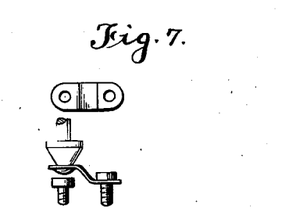
Figure 7 shows detail views of one of the contact springs.
Figure 8:
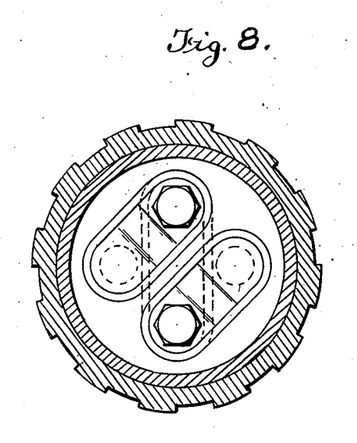
Figures 8 and 9 are views on the lines 8—8, 9—9 of Figure 3.
Figure 9:
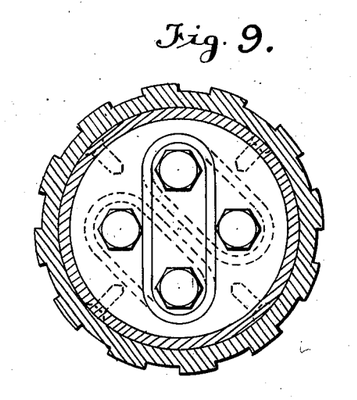
Figure 10:
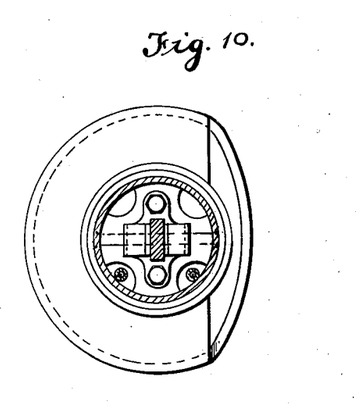
Figures 10 and 11 and 12 are views on the lines 10—10, 11—11 and 12—12 of Figure 2.
Figure 11:
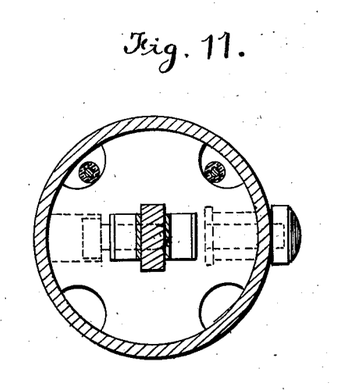
Figure 12:
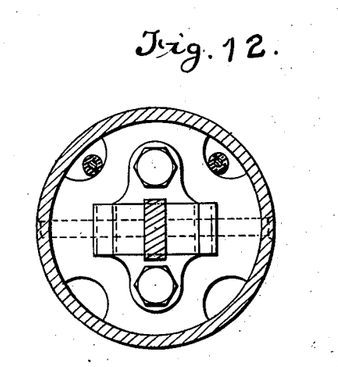
Figure 14:
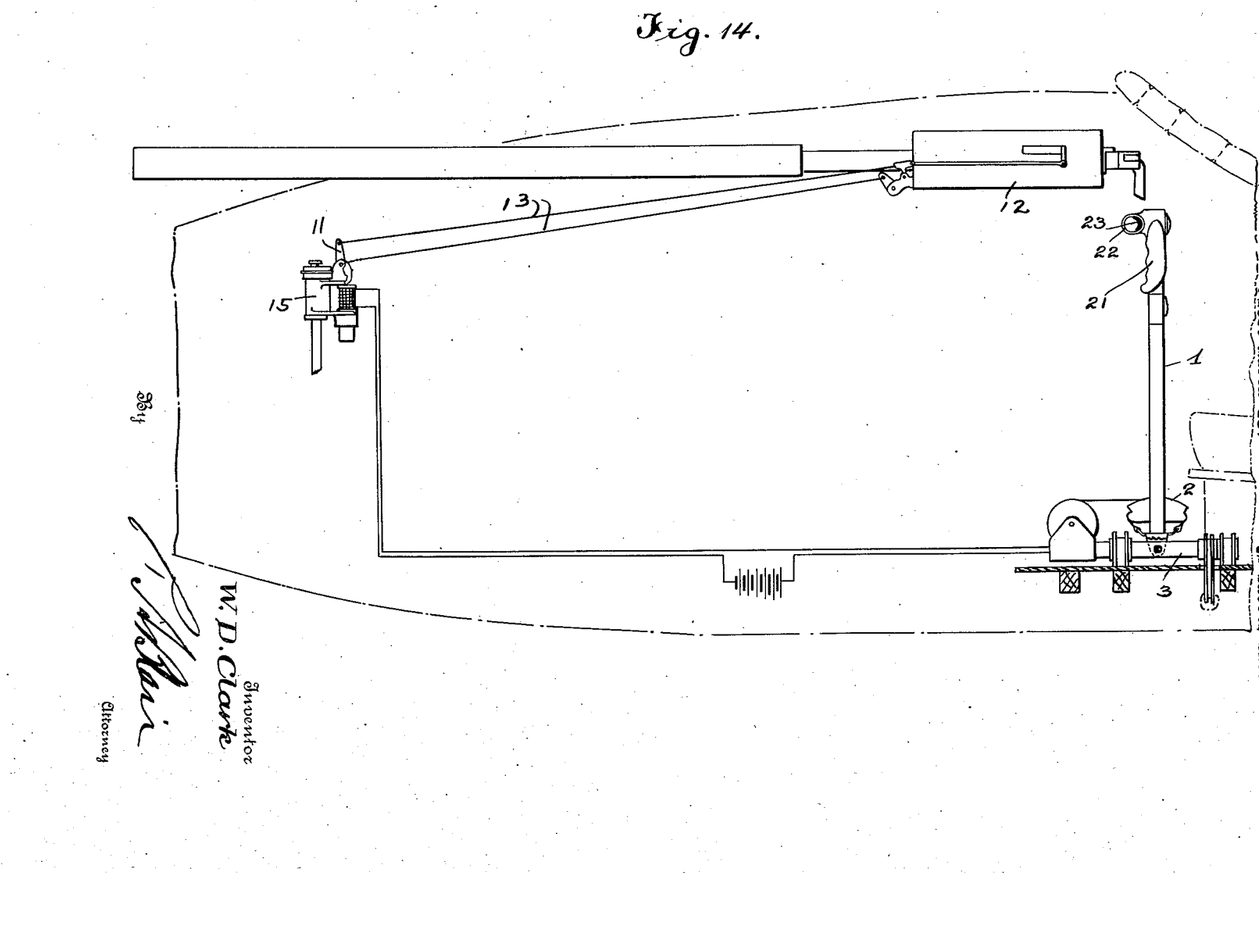
Figure 14 is a diagrammatic outline showing the forward position of an airplane, and having the modified form of mechanism located therein.
Figure 15:
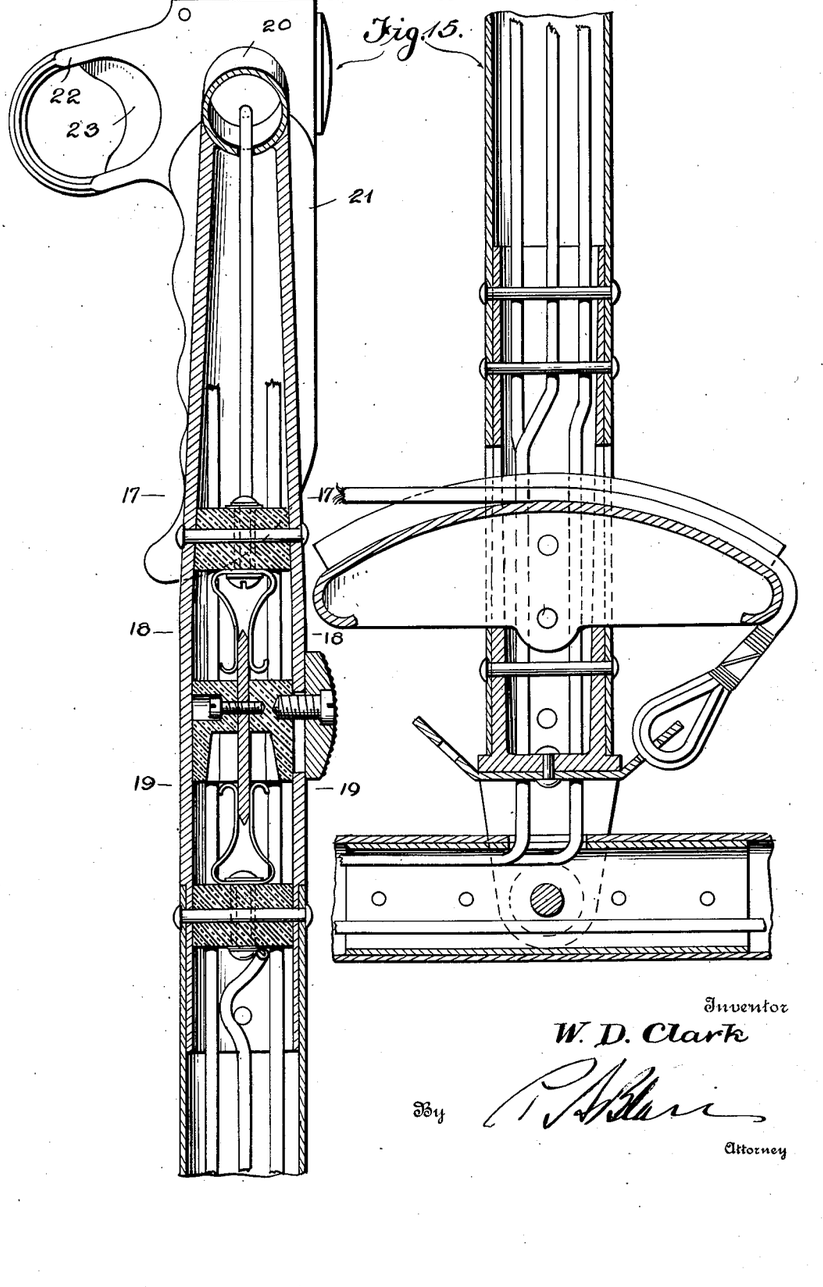
Figure 15 is a central vertical section through the control stick.
Figure 16:
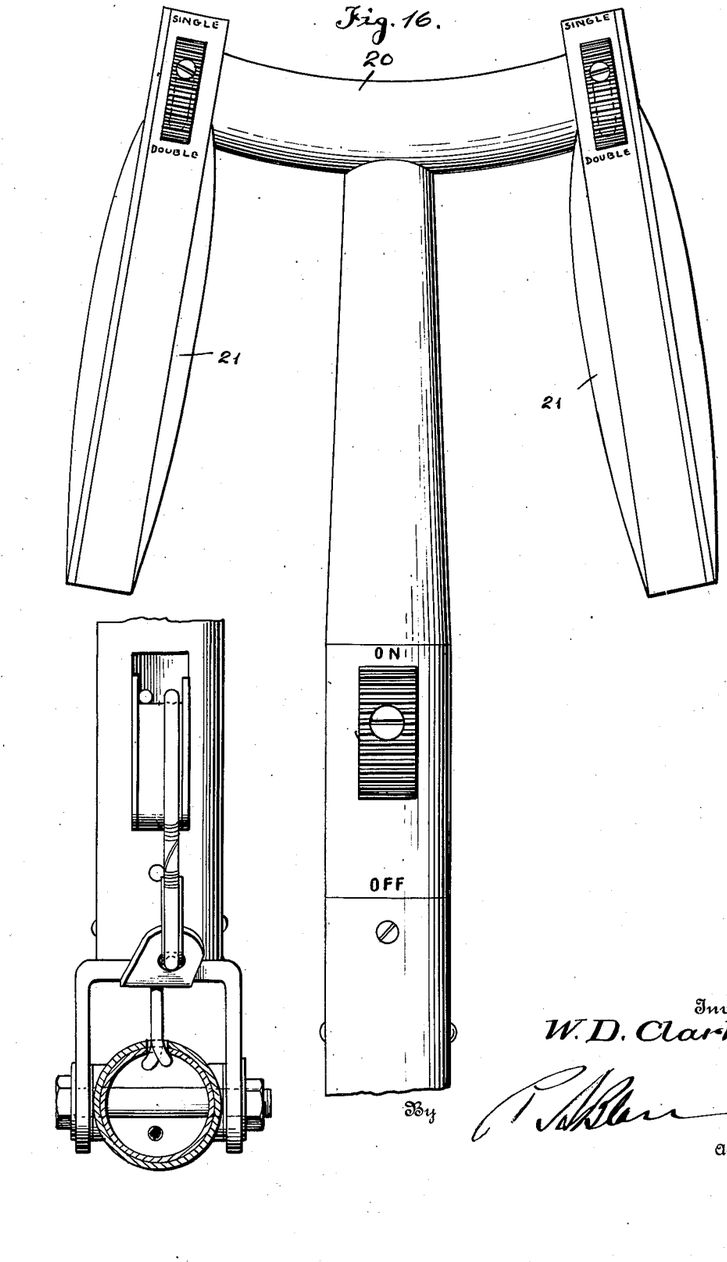
Figure 16 is a rear view of the same.
Figure 17:
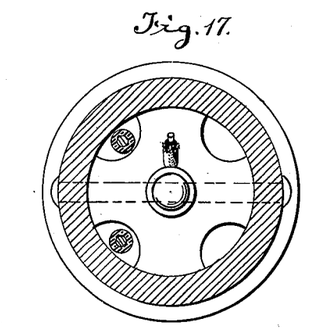
Figures 17, 18 and 19 are sections on the lines 17—17, 18—18, and 19—19 of Figure 15.
Figure 18:
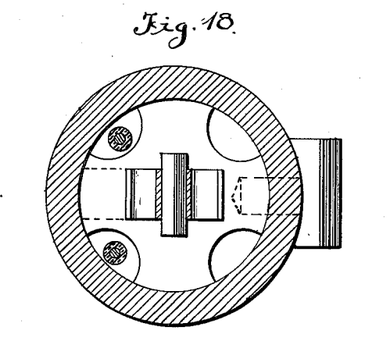
Figure 19:
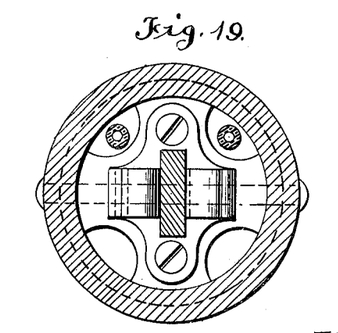

Referring now to the drawings in detail and particularly illustrating the first modification, the control stick comprises the vertically disposed tube 1 having at its lower end a sector 2 for actuating the elevators. The stick is pivoted to a fore and aft member 3 as usual, at its lower end, and is provided with a special hand grip 4, at its upper end. The grip 4 is designed so as to form a guard for housing the firing gear or contact buttons 6 and 7. To operate either gun independently the right or left hand contact button is depressed, thus completing an electric circuit shown more clearly in Figure 6. On completion of the circuit a solenoid 8 is actuated to withdraw the core against the pressure of a return spring 9 housed therebeneath. This permits the usual constantly oscillating plunger 10, connected with the usual synchronizing mechanism 15, to trip the rocker arm 11 which is connected with the trigger lever crank mechanism 12 of the gun by means of cables 13. While Figure 6 illustrates only one of these synchronizing mechanisms and connections with the gun it is, of course, to be understood that similar mechanism is associated with the other solenoid.

Figures 20, 21, 22:
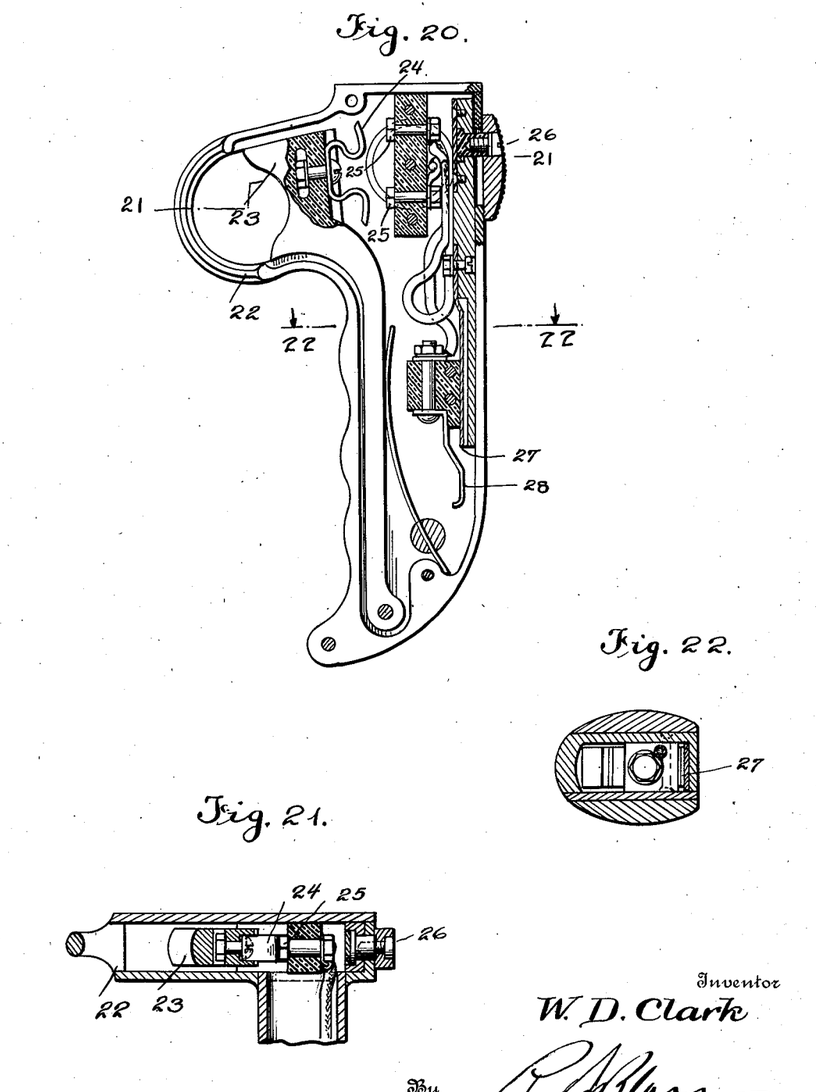
Figures 20, 21 and 22 are detail views of one of the control grips.

Referring now to the second modification, there is provided a means as previously stated for firing electrically the aircraft guns by the use of sealed switches directly associated with the hand grips of the control stick. A solenoid is used for releasing the synchronizing gear driven by the airplane engine. In this construction two grips are preferably provided whereupon the operator may place one hand on each grip if so desired. In this way the operator is enabled to fire either gun independently from its respective actuating mechanism, or by throwing either one of the thumb latch switches 26, located within reach of his thumb and without removing his hand from the control stick he may operate both guns simultaneously from either trigger. A trigger grip replaces the contact buttons on the previous form, and is preferably operated by the index finger which is allowed to fall naturally on the trigger as in firing a pistol, as will appear clear from Figure 20. In this construction the vertical tube of the control stick preferably terminates in a cross piece 20 which supports the right and left hand grips 21.

To operate either gun independently the operator upon sighting the target merely inserts his index finger in the trigger guard 22 and exerts pressure on the trigger 23. The trigger 23, has secured thereto a spring clip 24 which closes the circuit through posts 25, thus closing the circuit through the respective solenoids, thereby withdrawing the core of the solenoid against the return spring 9 as previously stated.

Figure 23:
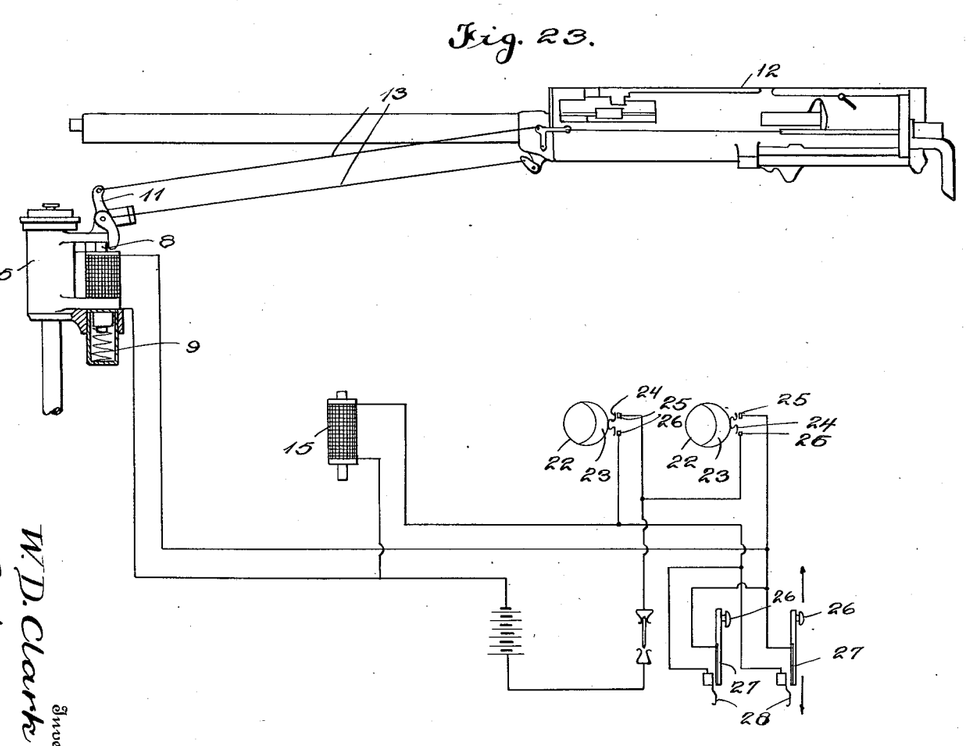
Figure 23 is a wiring diagram.

If the operator desires to fire the guns alternately the triggers may be pressed alternately, but if he desires to fire both guns simultaneously upon sighting the target, he either presses both triggers simultaneously, or first actuates one of the slide latch 26 located within reach of his thumb, which closes the circuit between the sliding contact 27 and the fixed contact 28, thus closing the circuit, as will be seen by referring to the wiring diagram 23. This operation permits both guns to be fired simultaneously from either trigger. The safety switch 26 is preferably opened when the device is to be rendered inoperative, thereby preventing accidental firing.

From the above description it will be seen that the present devices contemplate two of various possible embodiments of the invention, which will enable the operator or pilot of an airplane to actuate an electrically controlled mechanism without removing his hands from the control stick.

The invention is of simple and practical construction and may be readily applied to existing airplanes by merely substituting the control sticks herein shown. The synchronizing mechanism being of well-known construction a further detailed description is believed to be unnecessary.

What I claim is:—

1. In an airplane in combination, a gun generator releasing pin, a solenoid for controlling the gun generator releasing pin, a control stick, firing mechanism associated therewith and electrically connected with said solenoid and a guard for said firing mechanism.

2. In an airplane in combination, a gun generator releasing pin, a solenoid for controlling the gun generator releasing pin, a control stick, firing mechanism associated therewith electrically connected with said solenoid and a guard for said firing mechanism, said firing mechanism comprising a finger actuated movable member for closing the circuit and thereby actuating said solenoid.

3. In an airplane having electrically actuated releasing gear, a control stick, a plurality of finger actuated switches mounted on said stick and connected with said electrical releasing gear whereby either or both of said switches may be actuated as desired without removing the hand from the control stick.

4. In an airplane having electrically actuated releasing gear, a control stick, a plurality of finger actuated switches mounted on said stick and connected with said electrical releasing gear whereby either or both of said switches may be actuated as desired without removing the hand from the control stick and a safety switch mounted on said control stick for opening or closing the circuit to said releasing gear.

5. In an airplane provided with electrical releasing gear, a control stick, a plurality of finger actuated switches mounted on said control stick, suitable guards for said switches and means whereby said switches may be actuated separately or simultaneously as desired.

6. In an airplane provided with electrical releasing gear, a control stick, a plurality of finger actuated switches mounted on said control stick, suitable guards for said switches, means whereby said switches may be actuated separately or simultaneously as desired and finger guards for said switches to prevent accidental actuation thereof.

Signed at Washington, District of Columbia, this 30th day of January, 1925.

WILLIAM DOUGLAS CLARK.